United States Patent [19]
Rifkin

[11] Patent Number: 5,814,797
[45] Date of Patent: Sep. 29, 1998

[54] TRANSPONDER SYSTEM FOR MONITORING AND LOGGING DEPOSITORY TRANSACTIONS

[75] Inventor: Michael S. Rifkin, Kingston, Pa.

[73] Assignee: A Rifkin CO., Wilkes-Barre, Pa.

[21] Appl. No.: 743,621

[22] Filed: Nov. 4, 1996

[51] Int. Cl.⁶ .................................................. G06K 19/06
[52] U.S. Cl. ............................ 235/379; 902/26; 235/492
[58] Field of Search ................................... 235/382, 384, 235/379, 492, 380; 902/26

[56] References Cited

U.S. PATENT DOCUMENTS

| | | | |
|---|---|---|---|
| 3,750,167 | 7/1973 | Gehman et al. | 343/6.5 |
| 4,573,416 | 3/1986 | Masachika | 109/66 |
| 5,430,441 | 7/1995 | Bickley et al. | 235/375 |
| 5,478,991 | 12/1995 | Watanabe et al. | 235/384 |
| 5,481,464 | 1/1996 | Ramsden | 235/360 |
| 5,509,572 | 4/1996 | Curtis | 221/76 |

FOREIGN PATENT DOCUMENTS

| | | | |
|---|---|---|---|
| 1-96784 | 4/1989 | Japan | 235/492 |
| 6-180775A | 6/1994 | Japan | 235/492 |

OTHER PUBLICATIONS

IBM Technical Disclosure Bulletin, vol. 20, No. 7, Dec. 1977.

*Primary Examiner*—Donald T. Hajec
*Assistant Examiner*—Jacob Eisenberg
*Attorney, Agent, or Firm*—Michael Ebert

[57] ABSTRACT

A transponder system for monitoring and logging depository transactions in which bags loaded with funds to be deposited in a bank are put, one at a time, into a bank inlet hopper from which the bags drop through a chute into a vault. Incorporated in each bag is a tag in the form of a passive transponder adapted to receive a radio-frequency interrogation signal and to retransmit the signal as a coded signal defining a number identifying the bag. Installed in the vault is a transceiver that transmits the interrogation signal in a confined radiation field within the vault, the field being intercepted only when a tagged bag falls into the vault or is withdrawn from the vault. When the field is intercepted by a tagged bag, its transponder picks up the interrogation signal and transmits to the transceiver the coded signal identifying the bag. Each coded signal received by the transceiver is conveyed to a digital computer which registers the identity of the tagged bags and the time and date at which each bag is deposited or withdrawn from the vault. Data collected by the computer is printed out to provide a log of depository transactions.

9 Claims, 1 Drawing Sheet

TRANSPONDER SYSTEM FOR MONITORING AND LOGGING DEPOSITORY TRANSACTIONS

BACKGROUND OF INVENTION

1. Field of Invention

This invention relates generally to a system for keeping track of bags in which each bag is identified by a tag, and more particularly to a system of this type for monitoring and logging depository bags in which each bag is tagged by a passive transponder.

2. Status of Prior Art

A bank depository consists of a locked inlet hopper on an outside wall of the bank, the hopper feeding a chute leading into a vault. When an individual carrying a depository bag loaded with funds wishes to make a deposit, he unlocks the inlet and inserts the bag therein which then falls through the chute into the vault from which it is later withdrawn and unloaded. A bank depository, also referred to as a night depository or an after-hours depository, makes it possible for a client of the bank to deposit funds in his account during those hours in which the bank is closed.

Retail stores, restaurants and other establishments accumulate funds in the course of a business day whose hours do not correspond to those of a typical bank. It is not a safe practice for an establishment to keep in-house overnight, the funds it has accumulated and it, is for this reason that the funds are loaded into a depository bag and brought to an after-hours bank depository.

Existing bank depositories are manually operated and do not keep accurate track of the traffic in bags and the time and date on which the bags are deposited and later withdrawn. Moreover, an individual who deposits a loaded bag in a depository is given no receipt of this action. Should the bank later advise this individual that it has no record of his deposit, the individual is unable to prove that he did in fact make an after-hours deposit.

In order to provide a system for keeping track of depository transactions, it has heretofore been proposed to tag each bag with a bar code of the type now in current use in supermarkets to identify each product carried by the supermarket and its price. In a bar-code system each bar code-marked product must be passed over a bar code reader at a check-out counter. The output of the reader is fed to a register which totals the prices of the products purchased by a consumer and prints out a receipt. But a bar code system, as applied to depository bags, presents practical difficulties, for in order to read the bar code on the bag, it must make proper physical contact with a bar code reader which cannot be remote from the bag.

In a depository system in accordance with the invention for monitoring and logging depository bag transactions, use is made of a transponder set in which a passive transponder receives a radio-frequency interrogation signal transmitted by an interrogation station remote from the transponder and sends back a coded signal that can be interpreted by this station.

Of prior art interest is the postal tracking system disclosed in the Gehman et al. U.S. Pat. No. 3,750,167 for tracking mail bags through a post office to determine mail processing times as well as a processing delays. To this end, included in each mail bag to be tracked is a transponder identifying the bag.

A number of, transmission stations, located along the route at different points on which the bags are conveyed irradiate the bags passing through the stations with an ultrahigh-frequency (UHF) signal. The transponder included in the bag is actuated by this signal to transmit a very-high-frequency (UHF) signal. The postal tracking system includes a receiver for tracking a plurality of transponders to produce an output indicating when a transponder carried by a mail bag passes through each station along the post office route.

SUMMARY OF INVENTION

In view of the foregoing, the principal object of this invention is to provide a transponder system to monitor and log depository bag transactions.

More particularly, an object of this invention is to provide a system of the above type in which each bag has incorporated therein a tag in the form of passive transponder identifying the bag.

A significant advantage of a system in accordance with the invention is that it produces a log recording the tagged bags dropped into a bank vault and later withdrawn therefrom as well as the times and dates on which these actions take place.

Also an object of the invention is to provide a system of the above-type which issues a receipt to the individual who brings a tagged bag to the bank, the receipt identifying the bag and its time and date of deposit.

Briefly stated, these objects are attained by a transponder system for monitoring and logging depository transactions in which bags loaded with funds to be deposited in a bank are put, one at a time, into a bank inlet hopper from which the bags drop through a chute into a vault. Incorporated in each bag is a tag in the form of a passive transponder adapted to receive a radio-frequency interrogation signal and to retransmit the signal as a coded signal which defines a number identifying the bag.

Installed in the vault is a transceiver that transmits the interrogation signal in a confined radiation field in the vault, the field being intercepted only when a tagged bag falls into the vault or when a tagged bag is withdrawn from the vault. When the field is intercepted by a tagged bag, its transponder picks up the interrogation signal and transmits to the transceiver the coded signal identifying the bag number. Each coded signal received by the transceiver is conveyed to a digital computer which registers to identify the tagged bags and the time and date at which each bag is deposited or withdrawn from the vault. Data collected by the computer is printed out to provide a log of depository transactions.

BRIEF DESCRIPTION OF DRAWINGS

For a better understanding of the invention, as well as other objects and features thereof, reference is made to the accompanying drawing wherein.

DESCRIPTION OF INVENTION

Figure 1:
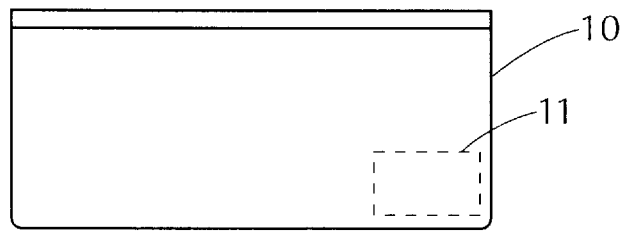
FIG. 1 schematically illustrates a depository bag for use in a system in accordance with the invention.

Referring now to FIG. 1 there is shown a depository bag 10 useable in a transponder system in accordance with the invention for monitoring and logging depository transactions. Bag 10 may be of standard design made of fabric or other suitable, durable material, except for the fact that incorporated in the structure of the bag is a tag in the form of passive transponder 11 which specifically identifies the bag.

A preferred form of transponder tag 11 is a transponder in a card format, such as a TIRIS transponder in a card format produced by Texas Instruments. A transponder in this flat form can be housed inconspicuously in a flat pocket sewn into an outer side wall of the bag. Or the transponder may be in a miniature disc format and fitted into an end wall socket of the bag.

A passive transponder has no power supply, for it is actuated by a radio-frequency interrogation signal received from an interrogation station to produce, in response to this signal, a coded signal which identifies the bag carrying the transponder. Thus if a bank having an after hours depository facility distributes to its clients five hundred depository bags, each bag will incorporate a transponder tag that uniquely identifies that bag by number and no other. Thus each transponder in the system must be adapted to transmit a coded signal which is distinct from those produced by the other transponders.

Figure 2:
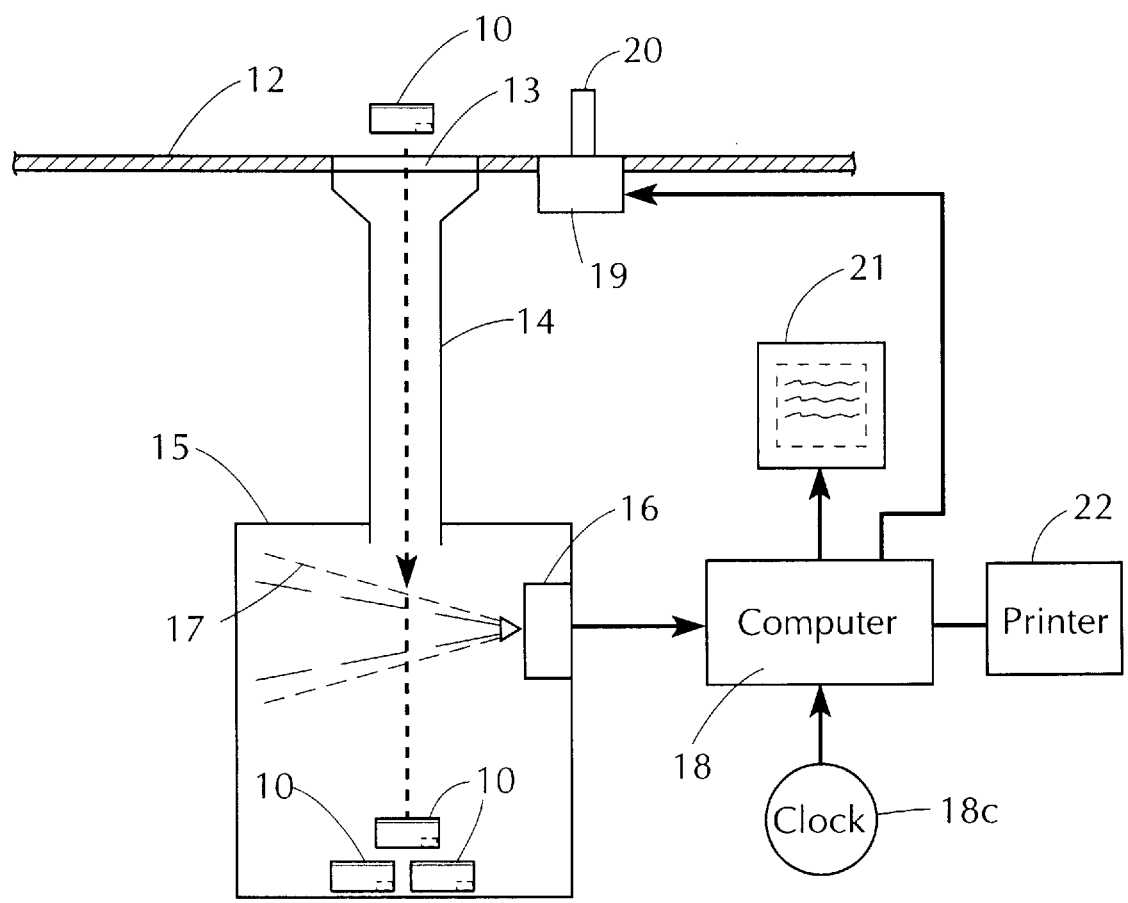
FIG. 2 is a block diagram of the system.

As shown schematically in FIG. 2, a bank having an after hours depository has placed on an outer wall 12 a locked inlet hopper 13. Inlet hopper 13 feeds into a chute 14 which leads to a bank vault 15. When an individual wishes to deposit a loaded depository bag, he unlocks inlet 13 with a key provided by the bank and then inserts the bag into the inlet so that it falls through the chute into the vault. As a result, in the course of each after hours period, several bags accumulate in the vault.

Installed in vault 15 is a powered transceiver 16 provided with an antenna adapted to transmit a radio-frequency interrogation signal in a limited range of a few feet in a confined radiation field 17 within the vault. When bag 10 is inserted in inlet hopper 13 and drops through chute 14 into vault 15, then in the course of its transit bag 10 passes through field 17. In doing so its transponder tag 11 intercepts the interrogation signal from the transceiver and sends back to the transceiver the coded signal identifying the bag.

Each coded signal received by transceiver 16 is in digital form and assigns a number to the bag. The coded signal received by the transceiver, each time a bag passes through field 17, is supplied to a digital computer 18 placed outside vault 15. Computer 18 is provided with a memory in which is digitally stored all of the numbers identifying the depository bags distributed by the bank.

When the number of a detected bag is fed from transceiver 16 into computer 18, this number is checked against the stored numbers and when a match is found, the bag number and the time and date at which the bag identified by this number is deposited in the vault is entered and stored in the computer.

Associated with computer 18 or incorporated therein is an electronic time clock 18C. Thus in each after-hours period of the bank during which the bank is closed, but its after-hours depository is open, all of the numbers of the bags deposited in the vault during this period and the time of date at which each bag is deposited are registered in the computer. And whenever a bag is deposited and the computer is advised of the bag number and the time and date of the bag deposit into the vault, this data is supplied by computer 18 to a receipt printing mechanism 19 mounted on the bank wall adjacent inlet hopper 13. Mechanism 19 prints out and ejects a paper receipt 20 which is taken by the individual who made the deposit, giving him proof of having deposited the bag identified on the receipt.

Associated with computer 18 is a video monitor 21 on whose screen is displayed, whenever the monitor is activated, whatever data has previously been collected in the computer. Also associated with the computer is a read-out printer 22 which when activated at the end of an after-hours period, then prints out all data collected by the computer in the course of this period, thereby providing a log of all bag transactions that took place in this period.

At the conclusion of an after-hours period, the loaded bags are withdrawn from the vault so that the funds therein can be deposited in the accounts of the respective clients of the bank.

The same monitoring system serves to keep track of withdrawals of bags 10 from vault 15. But in this case it is necessary that when a bag is withdrawn from the vault, that it pass through radiation field 17 projected from transceiver 16 so that the bag transponder sends to the transceiver a coded signal identifying the bag being withdrawn. Computer 18 is programmed to operate either in a deposit mode in which it registers the deposit of bags into the vault, or in a withdrawal mode in which it registers the withdrawal of bags from the vault. In practice, two transceivers may be included in the system, one to pick up the deposit of tagged bags and the other to pick up the withdrawal of the tagged bags, both transceivers being coupled to the computer which separately registers deposit and withdrawal transactions.

For security purposes it is important that the log show that the numbers of the identified bags withdrawn from the vault are the same as the numbers of the bags previously deposited therein. Thus with a system in accordance with the invention, one is able to keep track of all depository transactions, and an individual who make a deposit in the after-hours depository is given a receipt for this transaction.

OTHER APPLICATIONS

A transponder system of the above type is also applicable to armored vehicles for transporting depository bags loaded with funds. Such vehicles have a two man crew, one being a driver who remains in the vehicle to guard its contents, the other being a courier who leaves the vehicle to deliver and pick up bags. The usual armored vehicle route involves stopping at a bank customer in order to deliver to him empty bags and pick up loaded bags to be taken to the bank vault.

To keep account of these armored vehicle activities, the bags incorporate transponder tags and the interior of the vehicle has an on-board transceiver installed therein.

As tagged bags are taken out of the vehicle by a courier, a computer associated with the transceiver registers this action and later registers the return of the courier to the vehicle with loaded bags for delivery to a designated bank. When the vehicle at the end of the day returns to a company depot, the on-board computer is then downloaded into the main file of the company's computer to provide a complete record of the day's activities.

The vaults of the banks to which tagged bags are delivered by the armored vehicle are each equipped with a transceiver coupled to a computer to register the identity of the delivered bags and the time and date of their arrival.

While there has been shown and described a preferred embodiment of the transponder system for monitoring and logging depository transactions in accordance with the invention, it will be appreciated that many changes may be made thereon within the spirit of the invention.

I claim:

1. A transponder system to monitor and log depository transactions in which a plurality of bags loaded with funds to be deposited in a bank are put one at a time, into an inlet hopper on the outside of the bank, from which they pass through a chute to fall into a vault inside the bank, each bag in the plurality thereof being identified by a number that is different from the numbers identifying the other bags in the plurality, said system comprising:

A. a passive transponder tag incorporated in each of said bags adapted to receive a radio-frequency interrogation signal and to retransmit the signal as a digitally-coded signal defining the number identifying the bag;

B. a powered transceiver installed in the vault adapted to transmit said interrogation signal in a confined field within the vault whereby as each of said bags falls through the chute into the vault in the course of which it passes through said field, the transponder in the bag then picks up the interrogation signal and transmits the digitally-coded signal to said transceiver; and C. computer means coupled to said transceiver and responsive to the coded signals received thereby to register the number of each bag falling into the vault and to clock the time and date at which this action occurs to provide a log of depository transactions.

2. A system as set forth in claim 1, in which the transponder is in a card format and is placed in a pocket sewn in the bag.

3. A system as set forth in claim 1, in which the transponder is in a disc format and is held in a socket formed in the bag.

4. A system as set forth in claim 1, in which the transceiver has a transmission range no greater than about a few feet.

5. A system as set forth in claim 1, in which said transceiver senses the withdrawal of bags from said vault and identifies the numbers of these bags.

6. A system as set forth in claim 1, in which said means coupled to said transceiver is a digital computer in whose memory is stored the numbers of the bags in the plurality thereof, and in which the number of each bag falling into the vault is checked against the stored numbers and then registered in the computer.

7. A system as set forth in claim 6, having a read-out printer associated with the computer to print out the data stored in the computer.

8. A system as set forth in claim 6, having a video monitor associated with the computer to display the data stored therein.

9. A system as set forth in claim 1, having a receipt mechanism to print out the number of each bag deposited on the vault and the time and date of this action.

\* \* \* \* \*